US008244139B1

(12) United States Patent
Morgan et al.

(10) Patent No.: US 8,244,139 B1
(45) Date of Patent: Aug. 14, 2012

(54) SYSTEM AND METHOD FOR PROVIDING CASCADED OPTICAL LINE TERMINALS (OLTS) IN PASSIVE OPTICAL NETWORKS (PONS)

(75) Inventors: Peter J. Morgan, Glenelg, MD (US); Raymond Zanoni, Columbia, MD (US); Daniel E. Mazuk, Marion, IA (US); Alistair J. Price, Ellicott City, MD (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 761 days.

(21) Appl. No.: 12/378,218

(22) Filed: Feb. 12, 2009

(51) Int. Cl.
*H04J 14/00* (2006.01)
(52) U.S. Cl. ........... 398/165; 398/153; 398/168; 398/58
(58) Field of Classification Search ............... 398/58–64
See application file for complete search history.

(56) References Cited

U.S. PATENT DOCUMENTS

| | | | | |
|---|---|---|---|---|
| 5,920,410 A * | 7/1999 | Smith et al. | ...................... | 398/59 |
| 7,263,290 B2 * | 8/2007 | Fortin et al. | ...................... | 398/58 |
| 7,447,166 B1 * | 11/2008 | Kaluve et al. | ................. | 370/254 |
| 7,660,409 B1 * | 2/2010 | Czerwiec et al. | ........ | 379/413.02 |
| 7,768,943 B1 * | 8/2010 | Troxel et al. | ................... | 370/254 |
| 2004/0208549 A1 * | 10/2004 | Rutledge et al. | ................ | 398/50 |
| 2005/0249498 A1 * | 11/2005 | Haran et al. | ..................... | 398/58 |
| 2006/0104268 A1 * | 5/2006 | Lee et al. | ...................... | 370/389 |
| 2006/0171714 A1 * | 8/2006 | Dove | ............................... | 398/71 |
| 2007/0166037 A1 * | 7/2007 | Palacharla et al. | ............. | 398/72 |
| 2007/0217414 A1 * | 9/2007 | Berkman et al. | .............. | 370/390 |
| 2007/0237452 A1 * | 10/2007 | Truong | ........................... | 385/24 |
| 2007/0274718 A1 * | 11/2007 | Bridges et al. | .................. | 398/63 |
| 2008/0005296 A1 * | 1/2008 | Lee et al. | ...................... | 709/223 |
| 2008/0031263 A1 * | 2/2008 | Ervin et al. | .................... | 370/397 |
| 2008/0031624 A1 * | 2/2008 | Smith et al. | ..................... | 398/71 |
| 2008/0292314 A1 * | 11/2008 | Lu | ................................... | 398/58 |
| 2009/0010643 A1 * | 1/2009 | DeLew et al. | ................... | 398/17 |
| 2009/0129773 A1 * | 5/2009 | Oron | .............................. | 398/10 |
| 2009/0297162 A1 * | 12/2009 | Kai et al. | ...................... | 398/135 |
| 2010/0142944 A1 * | 6/2010 | Zou | ................................ | 398/25 |

\* cited by examiner

*Primary Examiner* — Nathan Curs
*Assistant Examiner* — Tanya Ngo
(74) *Attorney, Agent, or Firm* — Donna P. Suchy; Daniel M. Barbieri

(57) ABSTRACT

The present invention is a fiber optic data network, such as a passive optical network (PON), which includes a primary sub-network and a secondary sub-network. The primary sub-network may include a primary optical line terminal communicatively coupled to a plurality of primary optical network units. The secondary sub-network may include a secondary optical line terminal communicatively coupled to a plurality of secondary optical network units and to an intermediate optical network unit. The secondary sub-network may be communicatively coupled to the primary sub-network via the intermediate optical network unit, thereby allowing the PON to be configured so that the primary optical line terminal and the secondary optical line terminal are cascaded.

16 Claims, 3 Drawing Sheets

US 8,244,139 B1

SYSTEM AND METHOD FOR PROVIDING CASCADED OPTICAL LINE TERMINALS (OLTS) IN PASSIVE OPTICAL NETWORKS (PONS)

FIELD OF THE INVENTION

The present invention relates to the field of optics network systems and particularly to a system and method for providing cascaded optical line terminals (OLTs) in passive optical networks (PONs).

BACKGROUND OF THE INVENTION

Current fiber optic data networks/fiber optic data network systems may not provide a desired level of performance.

Thus, it would be desirable to provide a fiber optic data network/fiber optic data network system which obviates problems associated with current solutions.

SUMMARY OF THE INVENTION

Accordingly, an embodiment of the present invention is directed to a fiber optic data network, including: a primary sub-network, the primary sub-network including a primary optical line terminal communicatively coupled to a plurality of primary optical network units; and a secondary sub-network including: a secondary optical line terminal; a plurality of secondary optical network units; and an intermediate optical network unit, the secondary optical line terminal being communicatively coupled to the plurality of secondary optical network units and to the intermediate optical network unit, the secondary sub-network being communicatively coupled to the primary sub-network.

An additional embodiment of the present invention is directed to a method of communicating within a passive optical network (PON), the passive optical network (PON) including a primary sub-network and a secondary sub-network, said method including: broadcasting a first signal from a primary optical line terminal of the primary sub-network to a primary optical network unit of the primary sub-network and to a first secondary optical network unit of the secondary sub-network, said primary optical network unit and said first secondary optical network unit being communicatively coupled to the primary optical line terminal; providing a second signal from the first secondary optical network unit to a secondary optical line terminal of the secondary sub-network, the second signal being based upon the first signal, said secondary optical line terminal being communicatively coupled with the first secondary optical network unit; and providing a third signal from the secondary optical line terminal to a second secondary optical network unit of the secondary sub-network, the third signal being based upon the second signal, said second secondary optical network unit being communicatively coupled with the secondary optical line terminal.

A further embodiment of the present invention is directed to a computer program product, including: a computer useable medium including computer usable program code for performing a method for communicating within a passive optical network, said passive optical network including a primary sub-network and a secondary sub-network, the computer program product including: computer usable program code for broadcasting a first signal from a primary optical line terminal of the primary sub-network to a primary optical network unit of the primary sub-network and to a first secondary optical network unit of the secondary sub-network, said primary optical network unit and said first secondary optical network unit being communicatively coupled to the primary optical line terminal; computer usable program code for providing a second signal from the first secondary optical network unit to a secondary optical line terminal of the secondary sub-network, the second signal being based upon the first signal, said secondary optical line terminal being communicatively coupled with the first secondary optical network unit; and computer usable program code for providing a third signal from the secondary optical line terminal to a second secondary optical network unit of the secondary sub-network, the third signal being based upon the second signal, said second secondary optical network unit being communicatively coupled with the secondary optical line terminal.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Future avionics systems on commercial aircraft may migrate to fiber optic data buses. A Passive Optical Network (PON) such as a Gigabit Ethernet Passive Optical Network (GEPON) (ex.—which may operate according to Institute of Electrical and Electronics Engineers (IEEE) 802.3ah protocol, the International Telecommunication Union (ITU) G.984 standard, or the like) may be a way to implement fiber optic communications in avionics. A typical GEPON may include one master device (an optical line terminal (OLT)) and many slave devices (optical network units (ONUs)). The OLT may be located in a General Processing Module (GPM) and the ONUs may be located within Line Replaceable Units/Line Replaceable Modules (LRUs/LRMs). In a PON/GEPON, downstream communication may be Point-to-Multipoint (P2MP)/broadcast, and upstream communication may be Time Division Multiple Access (TDMA). A PON/GEPON may include a large number of ONUs (ex.—256 ONUs). For a PON/GEPON implemented on an aircraft, a majority of the ONUs may serve only minor functions (ex.—smoke detector, door closed sensor, cabin system function/sensors etc.) that require only occasional communication with the OLT/GPM. Further, the OLT may have to manage all of the ONUs through detecting, polling and reporting. Thus low data rate/ low communication ONUs may end up occupying similar time on the network as high data rate/high utilization ONUs, which may be a very inefficient utilization of the capacity of the network/PON/GEPON. The system/method of the present invention may address the above-referenced inefficiencies of current network solutions.

Figure 1:
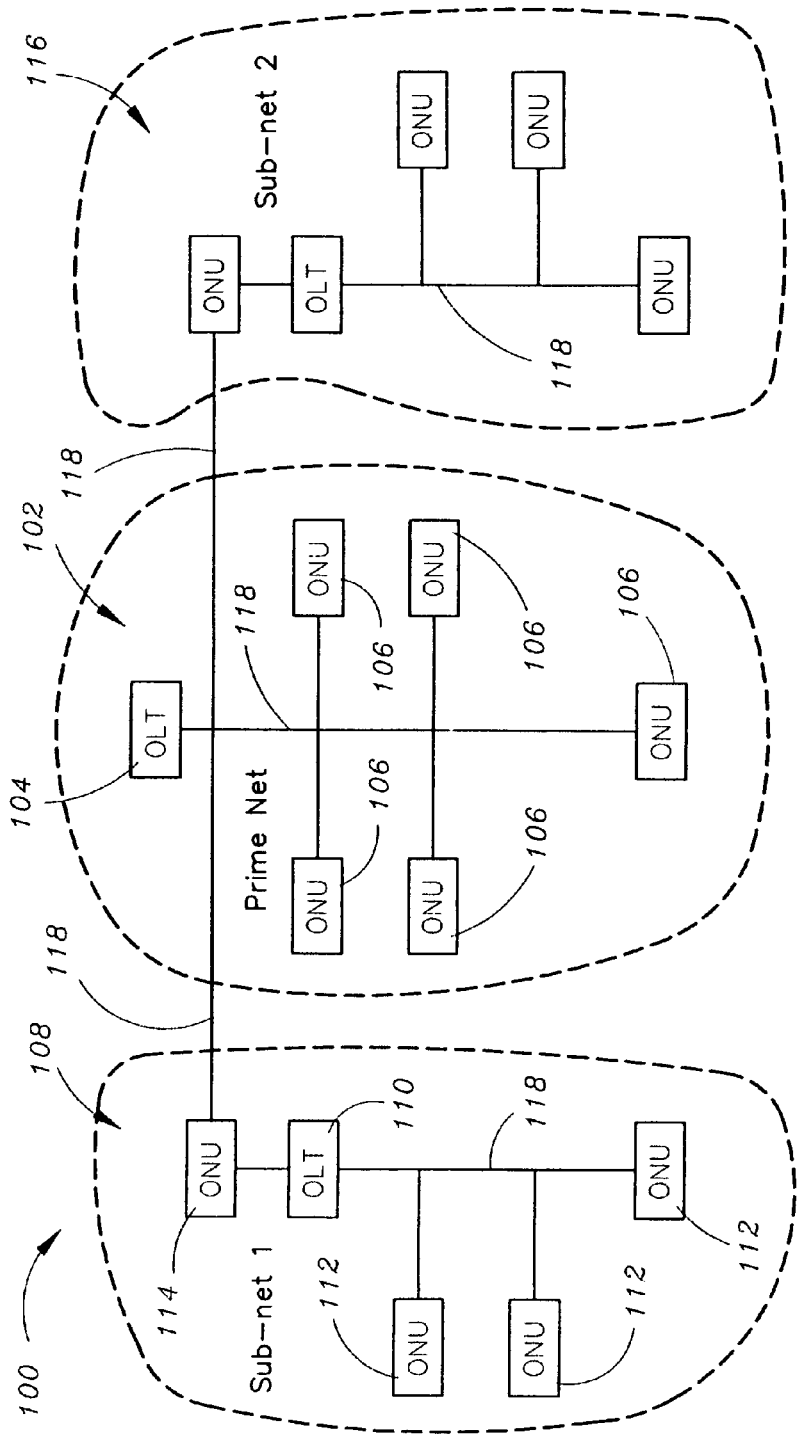
FIG. 1 is a block diagram schematic of a fiber optic data network (ex.—a passive optical network (PON)) having cascaded optical line terminals (OLTs) in accordance with an exemplary embodiment of the present invention.
Figure 2:
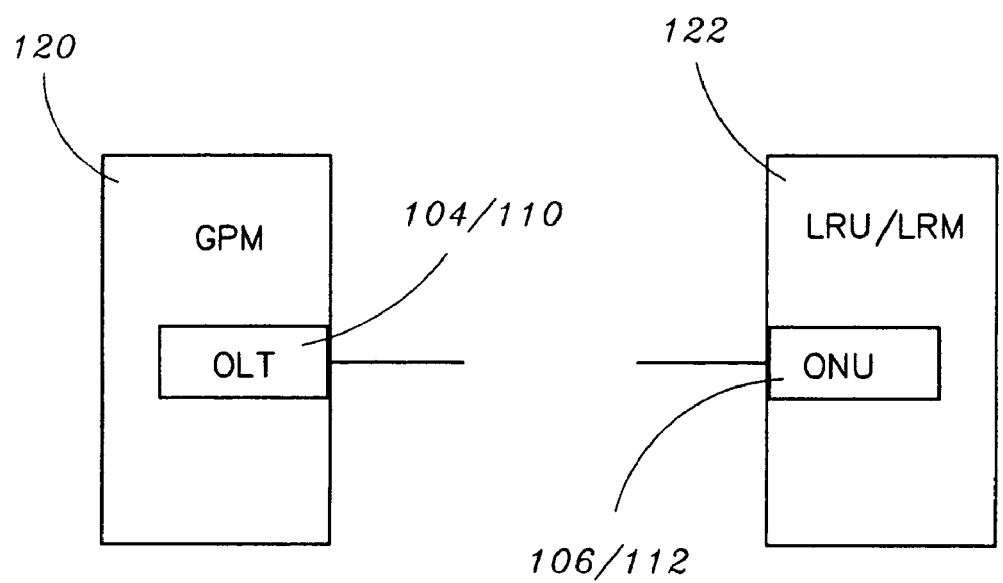
FIG. 2 is a block diagram schematic illustrating implementation of an optical line terminal (OLT) of the present invention within a general processing module (GPM) and further illustrating implementation of an optical network unit (ONU) of the present invention within a line replaceable unit/line replaceable module (LRU/LRM) in accordance with a further exemplary embodiment of the present invention.

Referring generally to FIGS. 1 and 2, a fiber optic data network in accordance with exemplary embodiment(s) of the present invention is shown. In current embodiments of the present invention, the fiber optic data network 100 may be a passive optical network (PON). For example, the fiber optic data network 100 may be a Gigabit Ethernet Passive Optical Network (GEPON) (ex.—which may operate according to Institute of Electrical and Electronics Engineers (IEEE) 802.3ah protocol)

In further embodiments, the fiber optic data network 100 may be an avionic fiber optic data network. For instance, the fiber optic data network 100 may be implemented for avionic applications/ implemented on-board an aircraft, such as on board a 737 Replacement Study (737 RS) aircraft.

In an exemplary embodiment of the present invention, the fiber optic data network 100 (ex.—GEPON) may include a primary sub-network 102. The primary sub-network 102 may include a primary optical line terminal 104. The primary sub-network 102 may further include one or more (ex.—a plurality of) primary optical network units 106. The primary optical line terminal 104 may be communicatively coupled to the plurality of primary optical network units 106. Further, each primary optical network unit included in the plurality of primary optical network units 106 may be a high data rate/ high priority/high utilization optical network unit. For example, each of said primary optical network units 106 may have data rate values between three Megabits per second and thirty Megabits per second.

In further embodiments of the present invention, the fiber optic data network 100 may include a secondary sub-network 108. The secondary sub-network 108 may include a secondary optical line terminal 110. The secondary sub-network 108 may further include one or more (ex.—a plurality of) secondary optical network units 112. The secondary sub-network 108 may further include an intermediate optical network unit 114. The secondary optical line terminal 110 may be communicatively coupled to the plurality of secondary optical network units 112 and to the intermediate optical network unit 114. The secondary sub-network 108 may be communicatively coupled to the primary sub-network 102. Further, each secondary optical network unit included in the plurality of secondary optical network units 112 may be a low data rate/low priority/low utilization (ex.—relative to the primary optical network units 106) optical network unit. For instance, each of said secondary optical network units 112 may have data rate values between thirty kilobits per second and three hundred kilobits per second. Still further, in exemplary embodiments, the intermediate optical network unit 114 may be a low data rate/low priority/low utilization optical network unit. In alternative embodiments, the intermediate optical network unit 114 may be a high data rate/high priority/high utilization optical network unit.

In exemplary embodiments of the present invention, the primary sub-network 102 and the secondary sub-network 108 are communicatively coupled via the intermediate optical network unit 114 of the secondary sub-network. As shown in FIG. 1, the intermediate optical network unit 114 may be connected between the primary optical line terminal 104 and the secondary optical line terminal 110.

In current embodiments of the present invention, the primary optical line terminal 104 is configured for broadcasting a first signal to each primary optical network unit included in the plurality of primary optical network units 106. The primary optical line terminal 104 is further configured for broadcasting the first signal to the intermediate optical network unit 114. Further, the primary optical network units 106 and the intermediate optical network unit 114 are configured for receiving said broadcast first signal from the primary optical line terminal 104.

In additional embodiments of the present invention, the intermediate optical network unit 114 is configured for providing a second signal to the secondary optical line terminal 110. Further, the second signal may be based upon the first signal.

In exemplary embodiments of the present invention, the secondary optical line terminal 110 is configured for receiving the second signal from the intermediate optical network unit 114 and for broadcasting a third signal to the plurality of secondary optical network units 112. Further, the third signal may be based upon the second signal.

In current embodiments of the present invention, a secondary optical network unit included in the plurality of secondary optical network units 112 may be configured for receiving the third signal from the secondary optical line terminal 110. The secondary optical network unit 112 may be further configured for providing a fourth signal to the secondary optical line terminal 110. Further, the fourth signal may be responsive to the third signal.

In further embodiments of the present invention, the secondary optical line terminal 110 may be configured for receiving the fourth signal from the secondary optical network unit 112. The secondary optical line terminal 110 may be further configured for providing a fifth signal to the intermediate optical network unit 114. Further, the fifth signal may be based upon the fourth signal.

In exemplary embodiments of the present invention, the intermediate optical network unit 114 may be configured for receiving the fifth signal from the secondary optical line terminal 110. The intermediate optical network unit 114 may be further configured for providing a sixth signal to the primary optical line terminal 104. Further, the sixth signal may be based upon the fifth signal and may be responsive to the first signal.

In current embodiments of the present invention, at least one primary optical network unit included in the plurality of primary optical network units 106 may be configured for providing a seventh signal to the primary optical line terminal 104. The primary optical line terminal 104 may be configured for receiving the seventh signal from the primary optical network unit 106. Further, the seventh signal may be responsive to the first signal.

In the fiber optic data network/PON/GEPON 100 of the present invention, cascaded OLTs (ex.—the primary optical line terminal 104 and the secondary optical line terminal 110) are implemented as a way to group low data rate/low utilization/low priority ONUs (ex.—the secondary optical network units 112) into a secondary sub-network 108. By providing a network 100 configured in this manner, the low data rate/ secondary optical network units 112 may be managed on the secondary sub-network 108 by the secondary optical line terminal 110. This takes some of the management burden off of the primary optical line terminal 104, and allows said primary optical line terminal 104 to focus (ex.—at least primarily) on managing the high priority/high data rate/high utilization ONUs (ex.—the primary optical network units 106) on the primary sub-network 102. Thus, the above-referenced configuration/characteristics of the network 100 of the present invention (ex.—the partitioning of said network into the primary sub-network 102 and the secondary sub-network 108) may allow the primary sub-network to have greater bandwidth and lower latency and may improve network efficiency since the low priority ONUs are managed on a different sub-network (ex.—the secondary sub-network 108).

In further embodiments of the present invention, the network/PON of the present invention may include one or more additional sub-networks 116 (as shown in FIG. 1) to allow for further partitioning of the network 100/prioritization of ONUs for improving network efficiency. Said additional sub-network(s) 116 may each include an OLT and a plurality of ONUs (including an intermediate ONU) and may be configured/may communicate within the network 100 in a manner similar to the secondary sub-network 108 described above.

In current embodiments of the present invention, the components (ex.—OLTs, ONUs) of the above-referenced network may be communicatively coupled via a fiber optic data bus 118 which may include one or more optical fibers and optical splitters for providing said communicative coupling/connectivity. Further, as shown in FIG. 2, one or more of the OLTs of the network 100 may be located in a General Processing Module(s) (GPMs) 120, and one or more of the ONUs may be located within a Line Replaceable Unit(s)/Line Replaceable Module(s) (LRUs/LRMs) 122. It is contemplated by the present application/present invention that, in an exemplary embodiment, the system 100 may be a packetized system (ex.—one or more of the signals discussed above may include packets which are delivered between the components of the system) and that the primary ONUs 106 and the secondary ONUs 112 may be configured for delivering packet(s) of said signal(s) to/receiving packet(s) of said signal(s) from an end user. It is further contemplated by the present application/present invention that providing signal(s) as described above may, in some embodiments, include generating and/or transmitting said signal(s).

Figure 3:
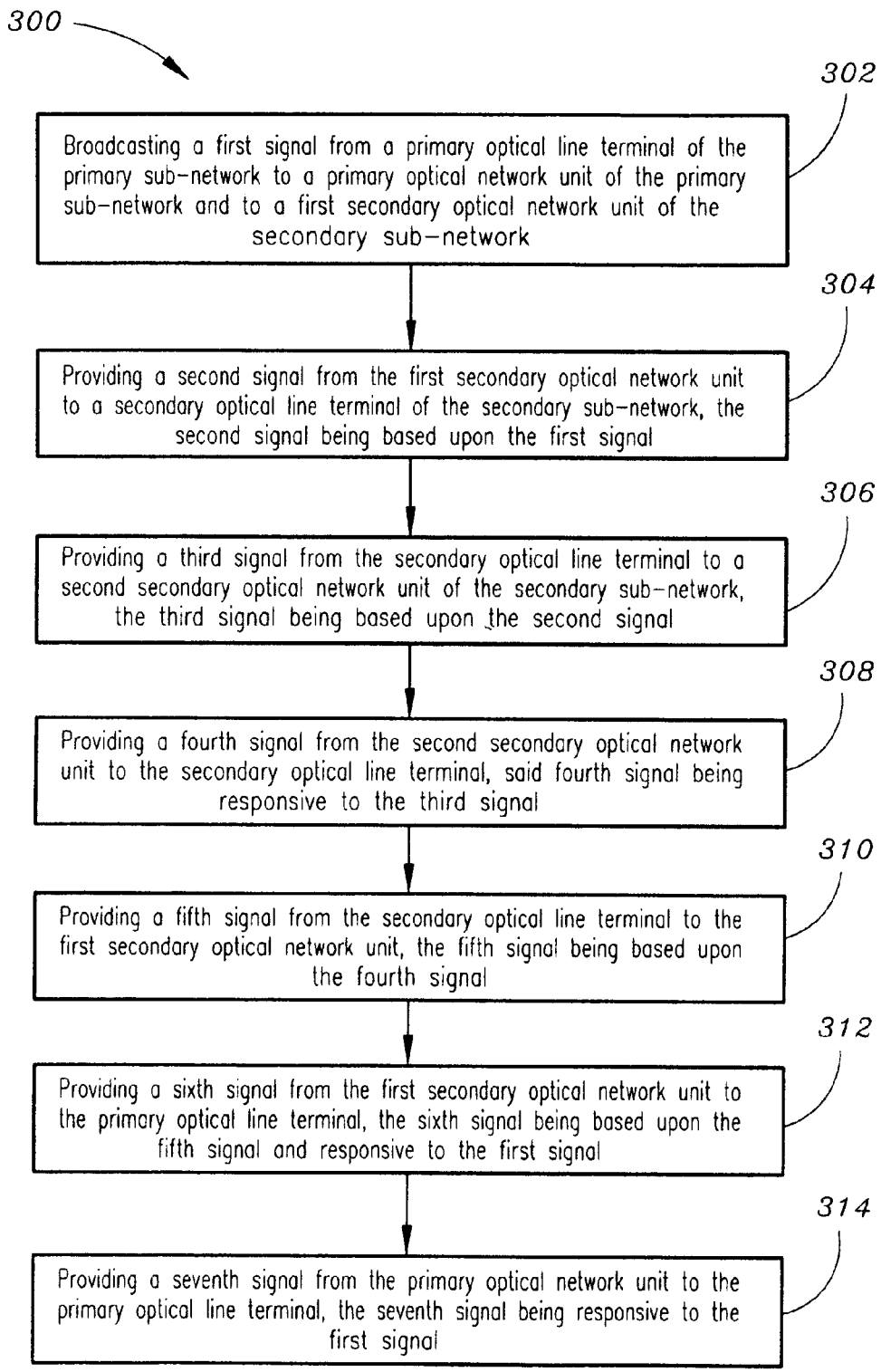
FIG. 3 is a flowchart illustrating a method of/method for communicating within/via a passive optical network (PON), such as shown in FIG. 1, in accordance with an additional exemplary embodiment of the present invention.

FIG. 3 is a flowchart illustrating a method of communicating within a passive optical network (PON), the passive optical network (PON) including a primary sub-network and a secondary sub-network, in accordance with an exemplary embodiment of the present invention. The method 300 may include the step of broadcasting a first signal from a primary optical line terminal of the primary sub-network to a primary optical network unit of the primary sub-network and to a first secondary optical network unit of the secondary sub-network 302. In exemplary embodiments of the present invention, the first secondary optical network unit of the secondary sub-network may be the intermediate optical network unit 114. Further, the first secondary optical network unit/intermediate optical network unit 114 and the primary optical network unit 106 may be communicatively coupled to the primary optical line terminal 104.

In further embodiments of the present invention, the method 300 may further include the step of providing a second signal from the first secondary optical network unit/intermediate optical network unit to a secondary optical line terminal of the secondary sub-network 304. Further, the second signal may be based upon the first signal. Still further, the secondary optical line terminal 110 may be communicatively coupled with the first secondary optical network unit/intermediate optical network unit 114.

In additional embodiments of the present invention, the method 300 may further include the step of providing a third signal from the secondary optical line terminal to a second secondary optical network unit of the secondary sub-network 306. Further, the third signal may be based upon the second signal. Still further, the second secondary optical network unit 112 may be communicatively coupled with the secondary optical line terminal 110.

In exemplary embodiments of the present invention, the method 300 may further include the step of providing a fourth signal from the second secondary optical network unit to the secondary optical line terminal 308. For example, the fourth signal may be responsive to the third signal.

In further embodiments of the present invention, the method 300 may further include the step of providing a fifth signal from the secondary optical line terminal to the first secondary optical network unit/intermediate optical network unit 310. For instance, the fifth signal may be based upon the fourth signal.

In additional embodiments of the present invention, the method 300 may further include the step of providing a sixth signal from the first secondary optical network unit to the primary optical line terminal 312. For example, the sixth signal may be based upon the fifth signal and responsive to the first signal.

In exemplary embodiments of the present invention, the method 300 may further include the step of providing a seventh signal from the primary optical network unit to the primary optical line terminal 314. For instance, the seventh signal may be responsive to the first signal.

It is to be noted that the foregoing described embodiments according to the present invention may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the present invention may be conveniently implemented in forms of a software package. Such a software package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A fiber optic data network implementing cascaded sub-networks, comprising:
    a primary sub-network including a primary optical line terminal communicatively coupled to a plurality of primary optical network units;
    a secondary sub-network including a secondary optical line terminal communicatively coupled to a plurality of secondary optical network units; and
    an intermediate optical network unit operatively connected in an upstream direction to the primary optical line terminal and in a downstream direction to the secondary optical line terminal to cascade the secondary sub-network with the primary sub-network operating via the intermediate optical network unit, wherein:
    the primary sub-network operates at a first data rate;
    the intermediate optical network unit operates at the first data rate;
    the secondary sub-network operates at a second data rate;
    the first data rate is greater than the second data rate, wherein the first data rate is at least three Megabits per second and the second data rate is no more than three hundred kilobits per second.

2. A fiber optic data network as claimed in claim 1, wherein the fiber optic data network is a passive optical network (PON) in which downstream communications comprise a point-to-multipoint broadcast protocol and upstream communications comprise a time division multiple access protocol.

3. A fiber optic data network as claimed in claim 1, wherein the fiber optic data network is a Gigabit Ethernet Passive Optical Network (GEPON).

4. A fiber optic data network as claimed in claim 1, wherein the fiber optic data network is an avionic fiber optic data network.

5. A fiber optic data network as claimed in claim 1, wherein the plurality of primary optical network units and the intermediate optical network unit are configured for receiving a first signal broadcast from the primary optical line terminal.

6. A fiber optic data network as claimed in claim 5, wherein the intermediate optical network unit is configured for providing a second signal to the secondary optical line terminal, said second signal being based upon the first signal.

7. A fiber optic data network as claimed in claim 6, wherein the secondary optical line terminal is configured for receiving the second signal and for broadcasting a third signal to the plurality of secondary optical network units, said third signal being based upon the second signal.

8. A fiber optic data network as claimed in claim 7, wherein a secondary optical network unit included in the plurality of secondary optical network units is configured for receiving the third signal and for providing a fourth signal to the secondary optical line terminal, said fourth signal being responsive to the third signal.

9. A fiber optic data network as claimed in claim 8, wherein the secondary optical line terminal is configured for receiving the fourth signal and for providing a fifth signal to the intermediate optical network unit, said fifth signal being based upon the fourth signal.

10. A fiber optic data network as claimed in claim 9, wherein the intermediate optical network unit is configured for receiving the fifth signal and for providing a sixth signal to the primary optical line terminal, said sixth signal being based upon the fifth signal and responsive to the first signal.

11. A fiber optic data network as claimed in claim 10, wherein a primary optical network unit included in the plurality of primary optical network units is configured for providing a seventh signal to the primary optical line terminal, said seventh signal being responsive to the first signal, the primary optical line terminal being configured for receiving the seventh signal.

12. A fiber optic data network as claimed in claim 4, wherein the optical network units of the secondary sub-network serve one or more low priority devices selected from the group consisting of smoke detectors, door closed sensors, and cabin system function sensors.

13. A fiber optic data network implementing cascaded sub-networks operating at different data rates, comprising:
    a primary sub-network operating at a first data rate, the primary sub-network including a primary optical line terminal communicatively coupled to a plurality of primary optical network units;
    a plurality of secondary sub-networks operating at a second data rate that is lower than the first data rate, each secondary sub-network including a secondary optical line terminal communicatively coupled to a plurality of secondary optical network units; and
    for each secondary sub-network, an intermediate optical network unit operating at the first data rate operatively connected in an upstream direction to the primary optical line terminal and in a downstream direction to the secondary optical line terminal to cascade the secondary sub-network with the primary sub-network via the intermediate optical network unit, wherein the first data rate is at least three Megabits per second and the second data rate is no more than three hundred kilobits per second.

14. A fiber optic data network as claimed in claim 13, wherein the fiber optic data network is an avionic network, and optical network units of the secondary sub-networks serve one or more low priority devices selected form the group consisting of smoke detectors, door closed sensors, cabin system function sensors.

15. An avionic fiber optic data network implementing cascaded sub-networks operating at different data rates, comprising:
    a primary sub-network operating at a first data rate, the primary sub-network including a primary optical line terminal communicatively coupled to a plurality of primary optical network units;
    a plurality of secondary sub-networks operating at a second data rate that is lower than the first data rate, each secondary sub-network including a secondary optical line terminal communicatively coupled to a plurality of secondary optical network units;
    for each secondary sub-network, an intermediate optical network unit operating at the first data rate operatively connected in an upstream direction to the primary optical line terminal and in a downstream direction to the secondary optical line terminal to cascade the secondary sub-network with the primary sub-network via the intermediate optical network unit;
    wherein optical network units of the primary sub-networks serve one or more high priority devices; and
    wherein optical network units of each secondary sub-network serve one or more low priority devices selected from the group consisting of smoke detectors, door closed sensors, cabin system function sensors, wherein the first data rate is at least three Megabits per second and the second data rate is no more than three hundred kilobits per second.

16. A fiber optic data network implementing cascaded sub-networks, comprising:
- a primary sub-network including a primary optical line terminal communicatively coupled to a plurality of primary optical network units;
- a secondary sub-network including a secondary optical line terminal communicatively coupled to a plurality of secondary optical network units; and
- an intermediate optical network unit operatively connected in an upstream direction to the primary optical line terminal and in a downstream direction to the secondary optical line terminal to cascade the secondary sub-network with the primary sub-network operating via the intermediate optical network unit, the plurality of primary optical network units and the intermediate optical network unit are configured for receiving a first signal broadcast from the primary optical line terminal, the intermediate optical network unit is configured for providing a second signal to the secondary optical line terminal, said second signal being based upon the first signal, wherein:

the primary sub-network operates at a first data rate;
the intermediate optical network unit operates at the first data rate;
the secondary sub-network operates at a second data rate;
the first data rate is greater than the second data rate.

* * * * *